US011036712B2

(12) United States Patent
Piaseczny et al.

(10) Patent No.: US 11,036,712 B2
(45) Date of Patent: Jun. 15, 2021

(54) LATENCY-REDUCED DOCUMENT CHANGE DISCOVERY

(71) Applicant: Microsoft Technology Licensing, LLC., Redmond, WA (US)

(72) Inventors: Michal Piaseczny, Bellevue, WA (US); Jordan Spencer Rudd, Lynnwood, WA (US); Amelie Dagenais, Kirkland, WA (US); Dmitry Shafranov, Seattle, WA (US); Yessen Yessetovich Amirzhanov, Kenmore, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 593 days.

(21) Appl. No.: 14/993,704

(22) Filed: Jan. 12, 2016

(65) Prior Publication Data

US 2017/0199788 A1 Jul. 13, 2017

(51) Int. Cl.
*G06F 16/23* (2019.01)
*G06F 11/14* (2006.01)
(Continued)

(52) U.S. Cl.
CPC ...... *G06F 16/2358* (2019.01); *G06F 11/1451* (2013.01); *G06F 11/1458* (2013.01);
(Continued)

(58) Field of Classification Search
CPC ......... G06F 17/30368; G06F 17/30174; G06F 16/2358
(Continued)

(56) References Cited

U.S. PATENT DOCUMENTS 4,974,194 A 11/1990 Barker et al.
6,628,285 B1 9/2003 Abeyta et al.
(Continued)

FOREIGN PATENT DOCUMENTS

CN 1577279 A 2/2005
KR 20070043353 A 4/2007

OTHER PUBLICATIONS

"Excel—Get an email notification whant sheet is updated", Published on: Sep. 2015 Available at: hittp://ccm.net/faq/6278-excel-get-an-email-notification-when-sheet-is-updated.
(Continued)

*Primary Examiner* — Mark E Hershley
(74) *Attorney, Agent, or Firm* — Merchant & Gould P.C.

(57) ABSTRACT

Latency-reduced document change discovery in a co-authoring session is provided. When a co-authoring session is established between clients for co-authoring a document, a communication channel that is separate from a content channel is established between each client in the co-authoring session and a notification service. When a client uploads edits made to the document to a server-stored and managed master copy of the document, the client sends a notification on the separate channel to the other clients via the notification service, notifying the other clients that document changes have been made and are available to download from the content service. The other clients are enabled to discover document changes in real-time or in near real-time to when the changes are saved to the master copy of the document, and download the client edits for merging the changes with a local copy of the document.

20 Claims, 8 Drawing Sheets

(51) Int. Cl.
*H04L 29/06* (2006.01)
*H04L 29/08* (2006.01)

(52) U.S. Cl.
CPC .............. *H04L 67/10* (2013.01); *H04L 67/26* (2013.01); *H04L 67/42* (2013.01); *G06F 2201/86* (2013.01)

(58) Field of Classification Search
USPC ........................................................ 707/625
See application file for complete search history.

(56) References Cited

U.S. PATENT DOCUMENTS

| | | | |
|---|---|---|---|
| 7,640,506 B2 | 12/2009 | Pratley et al. | |
| 7,937,663 B2 | 5/2011 | Parker et al. | |
| 8,321,784 B1 | 11/2012 | Ranganathan et al. | |
| 8,332,253 B1* | 12/2012 | Farmer | G06Q 10/0633 705/7.27 |
| 8,365,018 B2* | 1/2013 | McIntosh | H04L 43/50 714/23 |
| 8,417,666 B2 | 4/2013 | Bailor et al. | |
| 8,825,758 B2 | 9/2014 | Bailor et al. | |
| 9,210,067 B1* | 12/2015 | Agarwal | H04L 45/22 |
| 9,563,795 B2* | 2/2017 | Sehmer | G06F 21/35 |
| 10,051,078 B2* | 8/2018 | Burd | H04L 67/26 |
| 2002/0178184 A1 | 11/2002 | Kuchinsky et al. | |
| 2003/0037102 A1* | 2/2003 | Eckert | H04L 67/14 709/203 |
| 2003/0069980 A1* | 4/2003 | Picca | H04L 67/2814 709/227 |
| 2003/0090530 A1 | 5/2003 | Ramani et al. | |
| 2003/0131326 A1 | 7/2003 | Pfeil et al. | |
| 2003/0154243 A1 | 8/2003 | Crockett et al. | |
| 2003/0214528 A1 | 11/2003 | Pierce et al. | |
| 2004/0122897 A1 | 6/2004 | Seelemann et al. | |
| 2004/0172425 A1 | 9/2004 | Edelstein et al. | |
| 2005/0091578 A1 | 4/2005 | Madan et al. | |
| 2005/0138541 A1 | 6/2005 | Euchner et al. | |
| 2005/0144222 A1 | 6/2005 | Marshall | |
| 2006/0053380 A1* | 3/2006 | Spataro | G06F 16/93 715/753 |
| 2006/0080598 A1 | 4/2006 | Bargeron et al. | |
| 2006/0200755 A1 | 9/2006 | Melmon et al. | |
| 2007/0074122 A1 | 3/2007 | Nichols et al. | |
| 2007/0136449 A1 | 6/2007 | Da Palma et al. | |
| 2007/0283321 A1 | 12/2007 | Hegde et al. | |
| 2008/0159286 A1 | 7/2008 | Moore et al. | |
| 2008/0177782 A1 | 7/2008 | Poston et al. | |
| 2008/0180460 A1 | 7/2008 | Ford | |
| 2009/0006936 A1 | 1/2009 | Parker et al. | |
| 2009/0006948 A1 | 1/2009 | Parker et al. | |
| 2009/0083115 A1* | 3/2009 | Pearson | G06Q 30/0601 705/7.13 |
| 2009/0123076 A1 | 5/2009 | Wirth | |
| 2009/0125518 A1 | 5/2009 | Bailor et al. | |
| 2009/0157811 A1 | 6/2009 | Bailor et al. | |
| 2009/0172041 A1 | 7/2009 | Clarke et al. | |
| 2009/0271696 A1 | 10/2009 | Bailor et al. | |
| 2009/0327294 A1 | 12/2009 | Bailor et al. | |
| 2010/0030607 A1* | 2/2010 | Holcombe | G06Q 30/06 705/59 |
| 2010/0031135 A1 | 2/2010 | Naghshin et al. | |
| 2010/0088676 A1 | 4/2010 | Yuan et al. | |
| 2010/0306004 A1 | 12/2010 | Burtner et al. | |
| 2011/0010635 A1 | 1/2011 | Fox et al. | |
| 2011/0063328 A1 | 3/2011 | Herman et al. | |
| 2011/0145692 A1 | 6/2011 | Noyes et al. | |
| 2011/0225631 A1* | 9/2011 | Pearson | G06Q 20/405 726/4 |
| 2012/0070090 A1* | 3/2012 | Chang | G06F 3/005 382/218 |
| 2012/0192055 A1 | 7/2012 | Antebi et al. | |
| 2012/0192086 A1 | 7/2012 | Ghods et al. | |
| 2012/0192225 A1* | 7/2012 | Harwell | H04N 21/2668 725/34 |
| 2012/0233554 A1 | 9/2012 | Vagell et al. | |
| 2013/0013560 A1* | 1/2013 | Goldberg | G06Q 10/101 707/634 |
| 2013/0091419 A1 | 4/2013 | Caliman et al. | |
| 2013/0124956 A1* | 5/2013 | Hatfield | G06F 40/197 715/211 |
| 2013/0124967 A1 | 5/2013 | Hatfield et al. | |
| 2013/0138608 A1* | 5/2013 | Smith | G06F 16/27 707/610 |
| 2013/0254699 A1* | 9/2013 | Bashir | G06Q 10/10 715/772 |
| 2014/0258223 A1* | 9/2014 | Cao Minh | G06F 16/27 707/610 |
| 2014/0279846 A1* | 9/2014 | Srinivasan | G06F 16/93 707/608 |
| 2014/0298207 A1* | 10/2014 | Ittah | G06Q 10/00 715/753 |
| 2014/0372855 A1 | 12/2014 | Myerscough et al. | |
| 2015/0022666 A1* | 1/2015 | Kay | H04L 65/4084 348/159 |
| 2015/0233733 A1* | 8/2015 | Parks, III | G06Q 30/0185 340/870.02 |
| 2015/0294515 A1* | 10/2015 | Bergdale | H04W 4/80 340/5.61 |
| 2015/0347683 A1* | 12/2015 | Ansari | H04L 9/30 726/7 |
| 2015/0365217 A1* | 12/2015 | Scholten | H04W 88/04 370/315 |
| 2016/0094657 A1* | 3/2016 | Vieira | H04L 67/1095 709/217 |
| 2016/0162461 A1* | 6/2016 | Simon | G06F 40/18 715/220 |
| 2016/0179838 A1* | 6/2016 | Mavinakuli | G06F 16/176 707/618 |
| 2017/0116179 A1* | 4/2017 | Gagne-Langevin | G06F 40/226 |
| 2017/0161313 A1* | 6/2017 | Ritter | G06F 16/2365 |
| 2017/0185573 A1* | 6/2017 | Milvaney | G06F 40/197 |
| 2017/0199788 A1* | 7/2017 | Piaseczny | H04L 67/26 |
| 2020/0192875 A1* | 6/2020 | Rudolf | G06F 16/93 |

OTHER PUBLICATIONS

"Smartsheet Using Notifications", Retrieved on: Sep. 7, 2015 Available at: http://help.smartsheet.com/customer/portal/articles/542904-using-notifications#video.
"Folder notifications for Google Driven™", Retrieved on: Sep. 7, 2015 Available at: https://chrome.google.com/webstore/detail/folder-notifications-for/pamfobflonhoblkekglgpplpibfnckna.
"Document collaboration and co-authoring", Retrieved on: Sep. 7, 2015 Available at: https://support.office.com/en-in/article/Document-collaboration-and-co-authoring-ee1509b4-1f6e-401e-b04a-782d26f564a4?ui=en-US&rs=en-IN&ad=IN.
Gomes, Nuno, "Feature Request: Automatic e-mail Notification of Updates in Folders or Documents for Google Drive", Published on: Jun. 24, 2012 Available at: https://productforums.google.com/forum/#!topic/drive/fsYwbZ3hpjc.
"Auto CAD Mobile-App, CmapTools", May 2010, 258 Pages.
"Co-authoring (i.e. Simultaneous Editing) in Word 2010", Retrieved from <<https://web.archive.org/web/20110201120422/http://blogs.office.com/b/microsoft-word/archive/2009/09/09/co-authoring-in-word-2010.aspx>>, Sep. 9, 2009, 6 Pages.
"Co-Authoring in SharePoint 2010", Retrieved from <<https://www.youtube.com/watch?v=hgI4OIZTOzM>>, May 17, 2010, 7 Pages.
"SharePoint 2010 Co-Authoring Part 1 (Word 2010)", Retrieved from <<https://www.youtube.com/watch?v=ugeKMBWdh3U>>, Feb. 11, 2013, 11 Pages.
"Using Adobe® Acrobat® X PRO", Retrieved from <<https://helpx.adobe.com/archive/acrobat/X/pro/acrobat_X_pro_help.pdf>>, Oct. 2011, 496 Pages.
"Applicant Initiated Interview Summary Issued in U.S. Appl. No. 13/294,943", dated Apr. 5, 2018, 3 Pages.

(56) References Cited

OTHER PUBLICATIONS

"Final Office Action Issued in U.S Appl. No. 13/294,943", dated Jan. 11, 2018, 25 Pages.
"Final Office Action Issued in U.S. Appl. No. 13/294,943", dated Jul. 28, 2016, 20 Pages.
"Final Office Action Issued in U.S Appl. No. 13/294,943", dated Sep. 24, 2014, 20 Pages.
"Non Final Office Action Issued in U.S. Appl. No. 13/294,943", dated Dec. 3, 2015, 18 Pages.
"Non Final Office Action Issued in U.S. Appl.No. 13/294,943", dated Dec. 23, 2013, 19 Pages.
"Non Final Office Action Issued in U.S. Appl. No. 13/294,943", dated May 19, 2017, 22 Pages.
"Final Office Action Issued in U.S. Appl. No. 13/294,988", dated Feb. 26, 2018, 34 Pages.
"Final Office Action Issued in U.S. Appl. No. 13/294,988", dated Aug. 25, 2016, 24 Pages.
"Final Office Action Issued in U.S. Appl. No. 13/294,988", dated Oct. 23, 2014, 16 Pages.
"Non Final Office Action Issued in U.S. Appl. No. 13/294,988", dated Nov. 19, 2015, 22 Pages.
"Non Final Office Action Issued in U.S. Appl. No. 13/294,988", dated Feb. 28, 2014, 17 Pages.
"Non Final Office Action Issued in U.S. Appl. No. 13/294,988", dated May 18, 2017, 24 Pages.
"First Office Action Issued in Chinese Patent Application No. 201210448739.X", dated Feb. 10, 2015, 14 Pages.
"Notice of Allowance Issued in Chinese Application No. 201210448739. X", dated Feb. 26, 2016, 4 Pages.
"Second Office Action Issued in Chinese Patent Application No. 201210448739.X", dated Sep. 29, 2015, 10 Pages.
Adler, et al., "Challenges in Collaborative Authoring Software", Retrieved from <<http://citeseerx.ist.psu.edu/viewdoc/download?doi=10.1.1.90.2170&rep=rep1&type=pdf>>, Jul. 2011, 17 Pages.
Citro, et al., "Conflict Management for Real-Time Collaborative Editing in Mobile Replicated Architectures", In Proceedings of the School of Computer Science and Information Technology, Australian Computer Society, vol. 62, Jan. 2007, 10 Pages.
Kurze, Martin, "TDraw: A Computer-based Tactile Drawing Tool for Blind People", In Proceedings of the Second Annual ACM Conference on Assistive Technologies, Apr. 1996, 8 Pages.
Milsark, Andy, "SharePoint 2010 Document Co-Authoring with Microsoft Word", Retrieved from <<https://www.fpweb.net/sharepoint-blog/sharepoint-2010-ms-word-document-coauthoring/>>, Jun. 14, 2010, 7 Pages.
"International Search Report & Written Opinion Issued in PCT Application No. PCT/US2012/064011", dated Mar. 29, 2013, 9 Pages.
Qian, et al., "Collaborative Design with NetDraw", In Proceedings of Computer Aided Architectural Design (CARD), Jun. 1999, 14 Pages.
Sampson, Michael, "Making Collaboration Work: Strategy, Governance, User Adoption", Mar. 15, 2011, 13 Pages.
Thomas, Pete, "Drawing Diagrams in an Online Examination", Retrieved from <<https://dspace.lboro.ac.uk/dspace-ispui/bitstream/2134/1967/1/Thomas_P.pdf>>, Apr. 2004, 12 Pages.
"Non Final Office Action Issued in U.S. Appl. No. 13/294,943", dated Nov. 16, 2018, 22 Pages.
Ignat, et al., "Draw-together: Graphical Editor for Collaborative Drawing", In the Proceedings of the 20th Anniversary Conference on Computer Supported Cooperative Work, Nov. 4, 2006, pp. 269-278.
"Notice of Allowance Issued in U.S. Appl. No. 13/294,988", dated Jul. 25, 2019, 9 Pages.
"Microsoft word: adding images and drawings, applied tips", Retrieved From: http://appliedoffice.net/news/2007-mar/word.html, Mar. 2007, pp. 1-5.
"Non Final Office Action Issued in U.S. Appl. No. 13/294,988", dated Apr. 5, 2019, 31 Pages.
"Final Office Action Issued in U.S. Appl. No. 13/294,943", dated Jun. 27, 2019, 21 Pages.

* cited by examiner

FIG. 7 ions of the claimed subject matter, nor is it intended as an aid in
LATENCY-REDUCED DOCUMENT CHANGE DISCOVERY

BACKGROUND

Co-authoring functionality enables multiple users to remotely and simultaneously edit the same document in a co-authoring session. As changes/edits are made to a document on a client in a co-authoring session, the changes/edits are sent to a server where the master document is stored. Other clients in the co-authoring session are notified that there are changes/edits to the master document, and in response, download and merge the edits with the document being edited on the clients.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer-readable medium for reducing latency of document change discovery in a co-authoring session. When a co-authoring session is established between two or more client computing devices for co-authoring an electronic document, a communication channel that is separate from a content channel is established between each client communication device in the co-authoring session and the notification service. In some examples, the communication channel is a real-time or near real-time bidirectional and persistent communication channel (also referred to as a transport).

When a client computing device uploads client edits made to the electronic document to a content server where a master copy of the electronic document is stored and managed, a notification is sent on the separate communication channel to the other client computing device(s) in the co-authoring session, notifying the other client computing device(s) that document changes have been made and are available to download from the content server.

Accordingly, the other client computing device(s) are enabled to discover document changes in real-time or in near real-time to when the changes are saved to the master copy of the electronic document. In response to receiving the notification, the other client computing device(s) download the client edits for merging the changes with a local copy of the electronic document.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Figure 1:
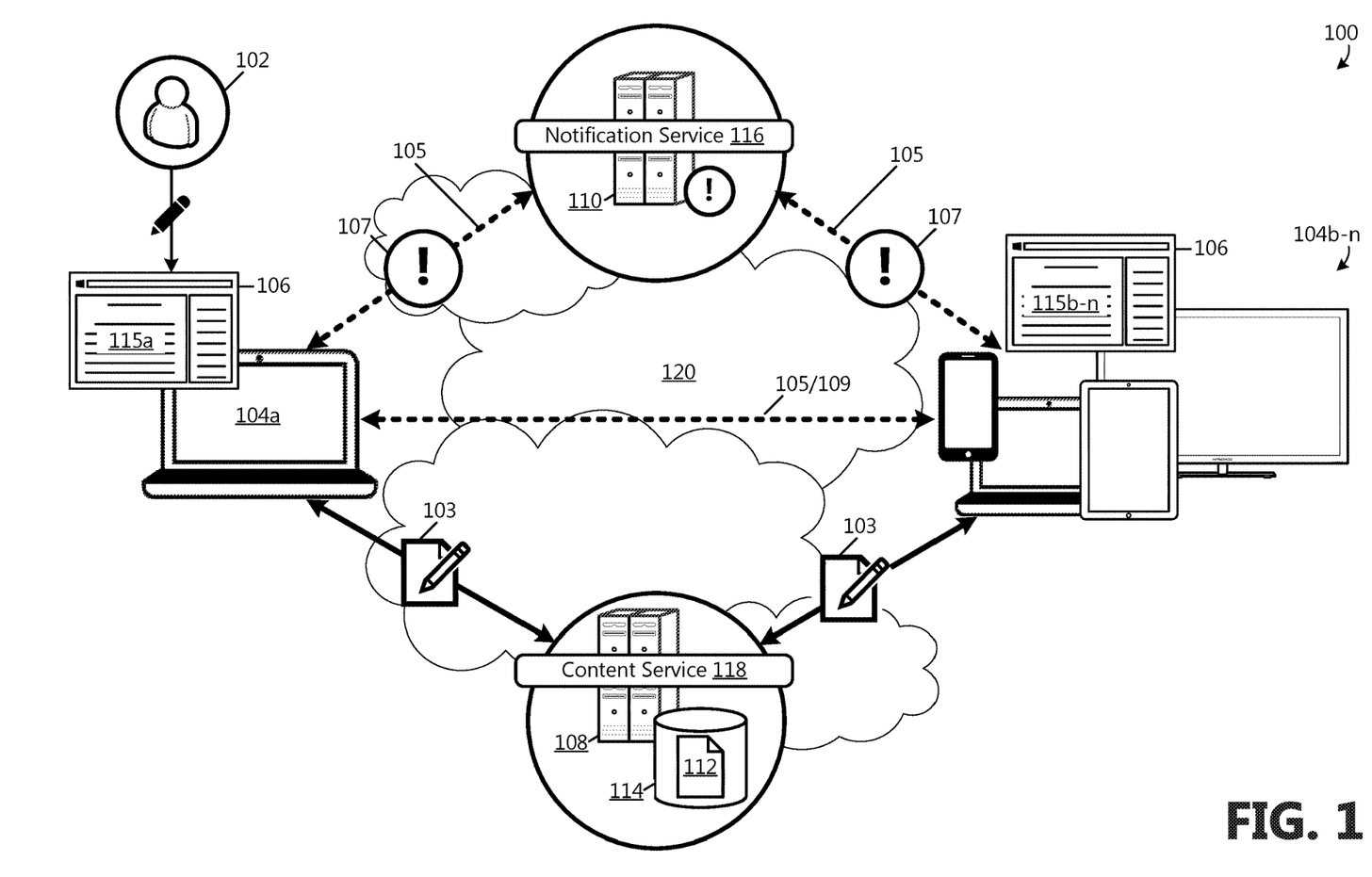
FIG. 1 is a block diagram showing components of an example system for latency-reduced document change discovery in a co-authoring session.

Aspects of the present disclosure are directed to a method, system, and computer storage medium for reducing latency of document change discovery in a coauthoring session. With reference now to FIG. 1, a block diagram of an example system 100 for latency-reduced change discovery in a co-authoring session is shown. As illustrated, the example system 100 includes a collaboration and/or document management server (herein referred to as a content server 108), comprising a content service 118 for enabling collaborative creation, management, and sharing of electronic documents. In some examples, the content server 108 is a shared resources server located at an enterprise, accessible by various clients computing devices 104*a-n* (collectively, 104). In other examples, the content server 108 is a shared resources server remotely located from the various clients 104 at which various client users 102 store and collaborate on various electronic documents. According to an aspect, the content service 118 is operative to store a master copy of an electronic document 112 in a local or remote storage repository 114. As should be appreciated, the storage repository 114 may include one or more storage repositories 114.

As mentioned above, the example system 100 includes a plurality of client computing devices 104, which are communicatively coupled to the content server 108 and storage device 114. According to an aspect, the content service 118 is operative to manage permissions associated with the electronic document 112 for allowing authorized users to access and edit the electronic document 112. According to an example, when an authorized user 102 opens the electronic document 112, for example, to edit the document via an application 106 executing on a client computing device 104, a local copy 115*a-n* (collectively, 115) of the document 112 associated with each coauthor. According to an example, and as illustrated, client edits 103 made to user copies 115 of the document are synchronized when the client computing devices 104 send the client edits 103 to the content service 118, the client edits 103 are saved to the master copy of the document 112 stored in the storage repository 114, and the client edits 103 are obtained by the other client computing devices 104 operatively associated with the co-authoring session.

According to aspects, the client computing devices 104 are operative to execute applications 106 for performing various tasks. According to an example, application 106 includes an application suitable for collaboration on and/or the co-authoring of an electronic document 112, such as a word processing application, a spreadsheet application, an electronic slide presentation application, a drawing and diagramming application, an email application, a notes taking application, a gaming application, and the like. According to an example, the electronic document 112 is a word processing document, a spreadsheet document, an electronic slide presentation, an email, a drawing, a notes page, and the like.

In some examples, the application 106 is a thin client application that splits storage of the application code and the execution thereof between the client computing device 104 and a server that operates remotely from the device 104 and is accessible over a network 120, such as the Internet or an internet. For example, an application 106 implemented as a thin application is hosted in a browser-controlled environment or coded in a browser-supported language, and is reliant on a user agent, such as a common web browser, to render the application 106 executable on the client computing device 104. In other examples, the application 106 is implemented as a thick application that is locally stored and executed on the client computing device 104. According to an aspect, the application 106 provides a user interface that allows a user 102 to interact with application content and content of electronic documents 112.

A client computing device 104 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device).

Referring still to FIG. 1, the example system 100 includes a notification service 116, executing on a notification server 110. Although the notification server 110 and the content server 108 are illustrated as separate and remote servers, in some examples, the notification service 116 and the content service 118 may operate on one set of hardware. According to an aspect, the notification service 116 is illustrative of a software module, system, or device operative to manage a real-time or near real-time communication connection (herein referred to as a transport 105) between client computing devices 104.

In some examples, the transport 105 is embodied as a persistent bi-directional connection (e.g., WebSockets) between the notification service 118 and the client computing devices 104 operatively associated with a co-authoring session of an electronic document 112. In other examples, the transport 105 is embodied as a one-way real-time or near real-time connection (e.g., via forever-frame techniques), wherein the connection from a client computing device 104 to the notification service 118 uses a separate connection from the notification service 118 to client computing device 104 connection. In other examples, the transport 105 is embodied as client long polling requests that stay open until the notification service 118 responds, such as Ajax long polling. In some examples, the transport 105 is embodied as a peer-to-peer communication connection 109, wherein the notification service 116 is operative to coordinate the connection(s) between client computing devices 104. In other examples, the transport 105 is embodied as a combination of two or more of the above examples. According to an aspect, the notification service 118 is operative to automatically select a best available transport 105 given the client's and server's best available transport 105.

According to an aspect, a client computing device 104*a* is operative to use the notification service 118 to send a notification 107 via the transport 105 to other client computing devices 104*b-n* in a co-authoring session. According to an example, when the client computing device 104*a* sends client edits 103 to the content service 118 to be synchronized with a master copy of an electronic document 112 and with other local copies 115*b-n* of the document, the client computing device 104*a* also sends a notification 107 to the notification service 116 via the transport 105 indicating that client edits 103 have been made to the document 112. According to another example, the notification 107 is sent when the client edits 103 are successfully saved to the storage repository 114. According to an aspect, for example, when the transport 105 is embodied as a peer-to-peer communication connection 109, a client computing device 104*a* is operative to send a notification 107 via the transport(s) 105 directly to one or more other client computing devices 104*b-n* in a co-authoring session.

The notification service 116 is operative to receive the notification 107, and broadcast the notification 107 to each of the other client computing devices 104*b-n* operatively associated with the co-authoring session. Accordingly, the other client computing devices 104*b-n* are enabled to discover that the document 112 has been modified with client edits 103 made by another user 102, and in response, send a download request to the content service 118 for the client edits 103 to synchronize with the local copies 115*b-n* of the document.

According to an aspect, the notification 107 is sent to the notification service 116 and is broadcast to the other client computing devices 104*b-n* in real-time or near real-time via the transport 105, providing the other client computing devices 104*b-n* in the co-authoring session a low-latency discovery of document changes. For example, instead of polling the content service 118 for discovering document changes on a polling interval, a real-time or near real-time notification 107 is automatically sent from the client computing device 104*a* on which the client edits 103 were made.

Accordingly, the end-to-end propagation time from the client computing device 104*a* on which the client edits 103 were made to all other client computing devices 104*b-n* in the co-authoring session is reduced, as it is not gated by a fixed polling interval. Additionally, network traffic and bandwidth are reduced by eliminating polling the content server 108 for discovering whether there are changes to the document 112 that need to be downloaded. For example, the other client computing devices 104*b-n* in the co-authoring session are enabled to send a download request to the content server 108 for the client edits 103 when the devices 104*b-n* discover (via the notification 107) that changes to the document 112 have been sent to the content server 108, and can be downloaded.

Figure 2:
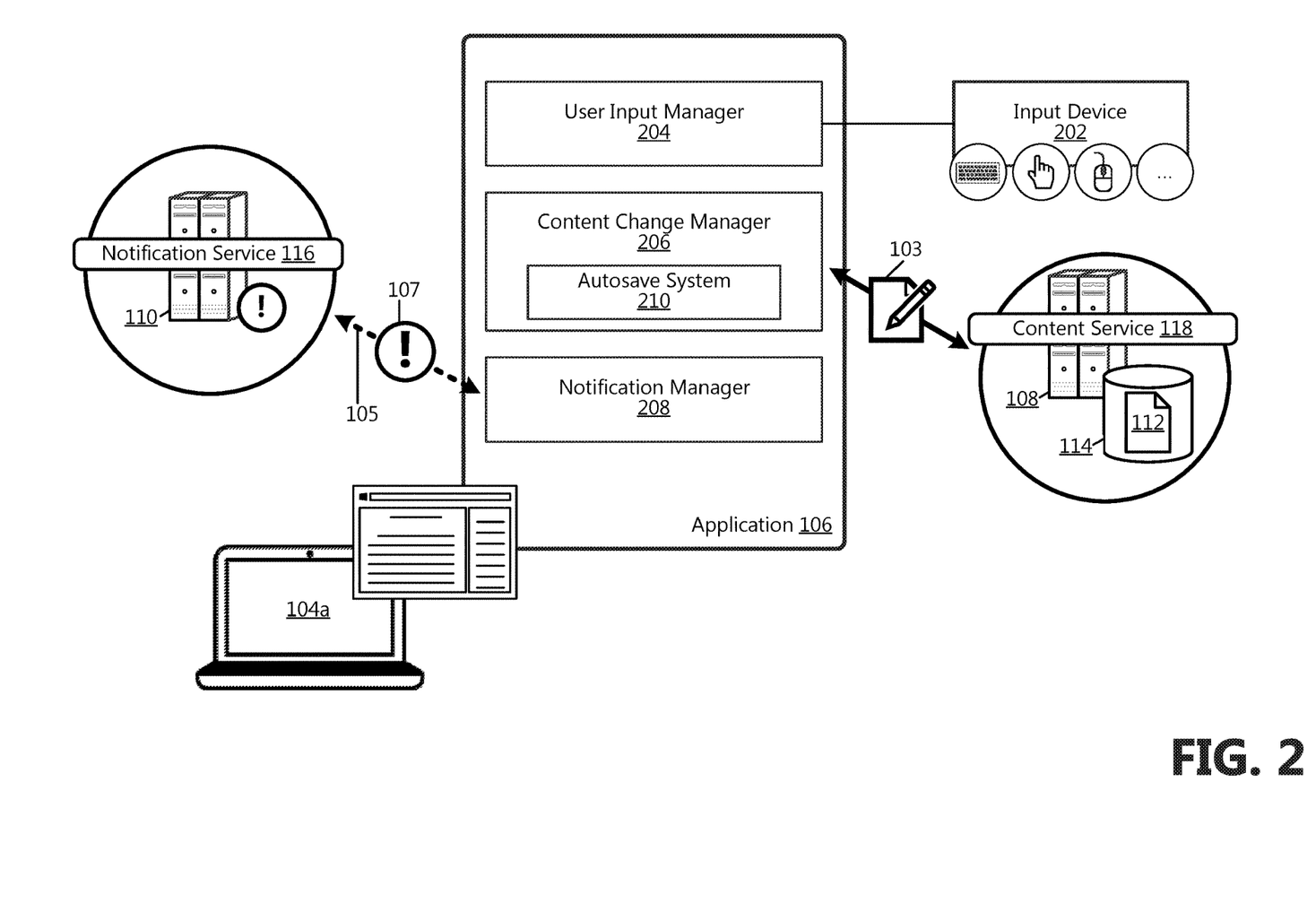
FIG. 2 is a block diagram illustrating components of a latency-reduced document change discovery system.

According to examples and with reference now to FIG. 2, the application 106 includes, or is operatively associated with, a user input manager 204, illustrative of a software module, system, or device operative to receive user input in association with a local copy 115 of an electronic document, and apply the user input to the local copy 115 of the document. For example, the user input manager 204 tracks inputs received via an input device 202 (e.g., touchscreen, mouse, keyboard, touchpad, gaze tracking device, gesture detection device, camera), and uses a set of methods and events to notify objects that a user 102 is performing an action related to a displayed visual element. For example, a user 102 may add, delete, or modify content in the local copy 115 of the document via the input device 202. Addition, deletion, or modification of document content is referred to herein as client edits 103 or changes.

According to an aspect, the application 106 includes, or is operatively associated with, a content change manager 206, illustrative of a software module, system, or device operative to synchronize client edits 103. In some examples, the content change manager 206 is operative to receive an indication of a save event, such as a selection made by the user 102 to save the local copy 115 of the document, and generate an upload request to send client edits 103 to the content service 118 for updating the master copy of the document 112. In some examples, the content change manager 206 includes an autosave system 210 operative to receive an indication of automatic save criteria being met, such as a predetermined time interval, and generate an upload request to send client edits 103 to the content service 118 for updating the master copy of the document 112. According to an aspect, the content change manager 206 is further operative to transmit the upload request to the content service 118. For example, the content change manager 206 transmits the upload request to the content service 118 via a content channel.

According to an aspect, the content change manager 206 is further operative to receive an indication of client edits 103 made to the document 112 by another user in a co-authoring session, and synchronize the changes made to the document 112 with the local copy 115a of the document. For example, in a co-authoring session of the document 112, one or more other users may add, delete, or modify document content via an application 106 executing on one or more other client computing devices 104b-n. Accordingly, the client edits 103 made by other users in the co-authoring session are uploaded to the content server 108, and are saved to the master document 112 stored in the storage repository 114.

According to an aspect, the application 106 includes, or is operatively associated with, a notification manager 208, illustrative of a software module, system, or device operative to establish a connection with the notification service 116 for sending and receiving notifications 107 via a real-time or near real-time transport 105. In some examples, when the electronic document 112 is opened by another client computing device 104b-n for a co-authoring session, for example, when another user opens the electronic document 112 on another client computing device 104b, the content service 118 may provide a notification to the client computing devices 104a,b. In some examples, the content change manager 206 receives the notification, and notifies the notification manager 208. In response, the notification managers 208 make an application programming interface (API) call to the notification service 116 to establish a real-time or near real-time communication connection (i.e., transport 105) with the notification service 116.

According to an aspect, when the content change manager 206 generates an upload request to send client edits 103 to the content service 118 for updating the master copy of the document 112, the notification manager 208 is operative to generate and send a notification 107 via the transport 105 to the notification service 116 indicating that client edits 103 have been made to the document 112. The notification service 116 then broadcasts the notification 107 to the other client computing devices 104b-n via the real-time or near real-time communication connection (i.e., transport 105) established with the notification service 116. In some examples, the notification manager 208 generates and sends the notification 107 upon receiving a confirmation from the content service 118 that a save of the client edits 103 was successful.

In some examples, such as when the transport 105 is embodied as a peer-to-peer communication connection 109, the notification manager 208 is operative to coordinate one or more connections (i.e., peer-to-peer communication connections 109) between client computing devices 104a-n in a co-authoring session, and the notification manager 208 generates and sends the notification 107 directly to each client computing devices 104a-n in the co-authoring session.

Each notification manager 208 associated with each of the other computing devices 104b-n receives the notification 107, and notifies the content change manager 206 to generate and send a download request to the content service 118 to retrieve the client edits 103 and merge the changes with the local copy 115b-n of the document.

As described above, and with reference now to FIG. 3, the propagation time, starting at the point 301, where a first client computing device 104a uploads client edits 103 to the content service 118 (client edits upload 302), and ending at the point 303, where one or more other client computing devices 104b-n in a co-authoring session of a document 112 discover that there are changes to the document 112 that need to be merged with local copies 115b-n of the document, is reduced. Thus, a total time of uploading client edits 103 on a first client computing device 104a to download the client edits 103 on a second client computing device 104b is also reduced.

Figure 3:
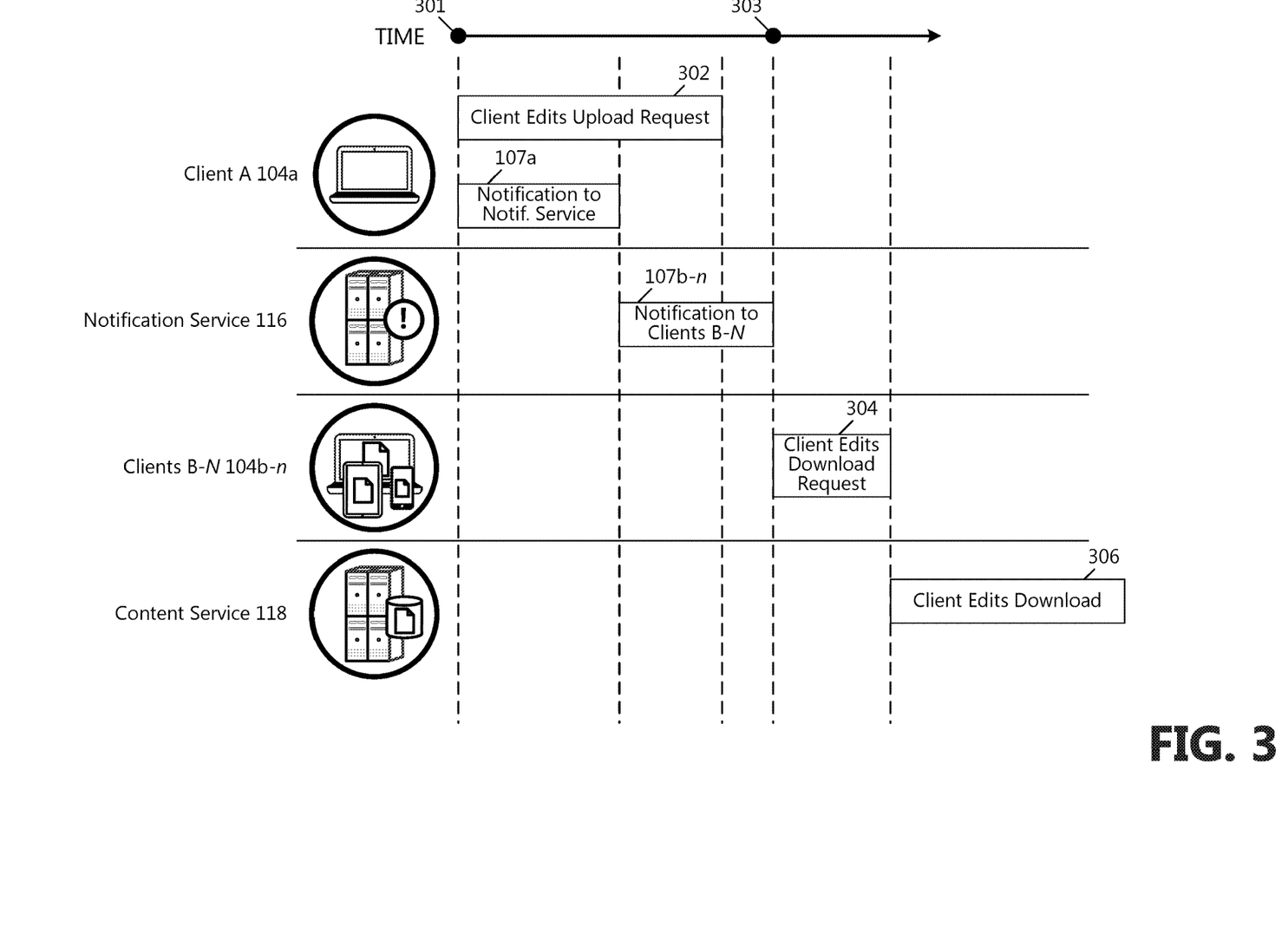
FIG. 3 is a time diagram illustrating latency reduction in document change discovery.

For example, by uploading client edits 103 to the content service 118 (client edits upload 302) and sending a notification 107a to the notification service 116 on a separate real-time or near real-time channel (transport 105) either concurrently or in response to receiving an indication of a successful save of the client edits 103 for broadcasting notifications 107b-n to other client computing devices 104b-n in the co-authoring session indicating that there are changes to the document 112, the one or more other client computing devices 104b-n are enabled to discover the changes more quickly than polling the content server 108 for discovering changes to the document 112 that need to be downloaded.

In response, the one or more other client computing devices 104b-n in the co-authoring session can generate and send a client edits download request 304 to the content service 118, then download the client edits 103 (client edits download 306) for merging with the local copies 115b-n. As can be appreciated, reducing the latency in discovering document changes so that client edits 103 made to a document 112 in a co-authoring session can be uploaded sooner, which provides an improved user experience and can help reduce the number and severity of coauthoring conflicts.

For example, when a first client computing device 104a and a second client computing device 104b download a document 112 from the content server 108, the respective local copies 115a,b of the document 112 and the master copy of the document 112 are all in sync. In a situation where users of both client computing devices 104a,b make client edits 103 to the local copies 115a,b and the client computing devices 104a,b try to upload the client edits 103 at a same time, a coauthoring conflict occurs. In some examples, one client computing device 104 (e.g., 104a) will succeed in uploading the client edits 103 (e.g., the client who was able to upload the edits to the content service 118 first), and the other client computing device 104 (e.g., 104b) may receive an error requiring the client (104b) to download the changes made by the other client (104a) to merge with the local copy 115b of the document 112, then retry uploading its client edits 103 to the content server 108. According to aspects, by reducing the latency in discovering document changes in a co-authoring session, client computing devices 104a-n are enabled to catch up with the latest changes saved to the master copy of the document 112 stored on the content server 108, and thus reduce the risk of the changes becoming obsolete by other clients uploading other changes before the client edits 103 are received. As another example, users 102 are enabled to more quickly see and react to client edits 103 automatically merged with their local copy 115a-n.

Figure 4:
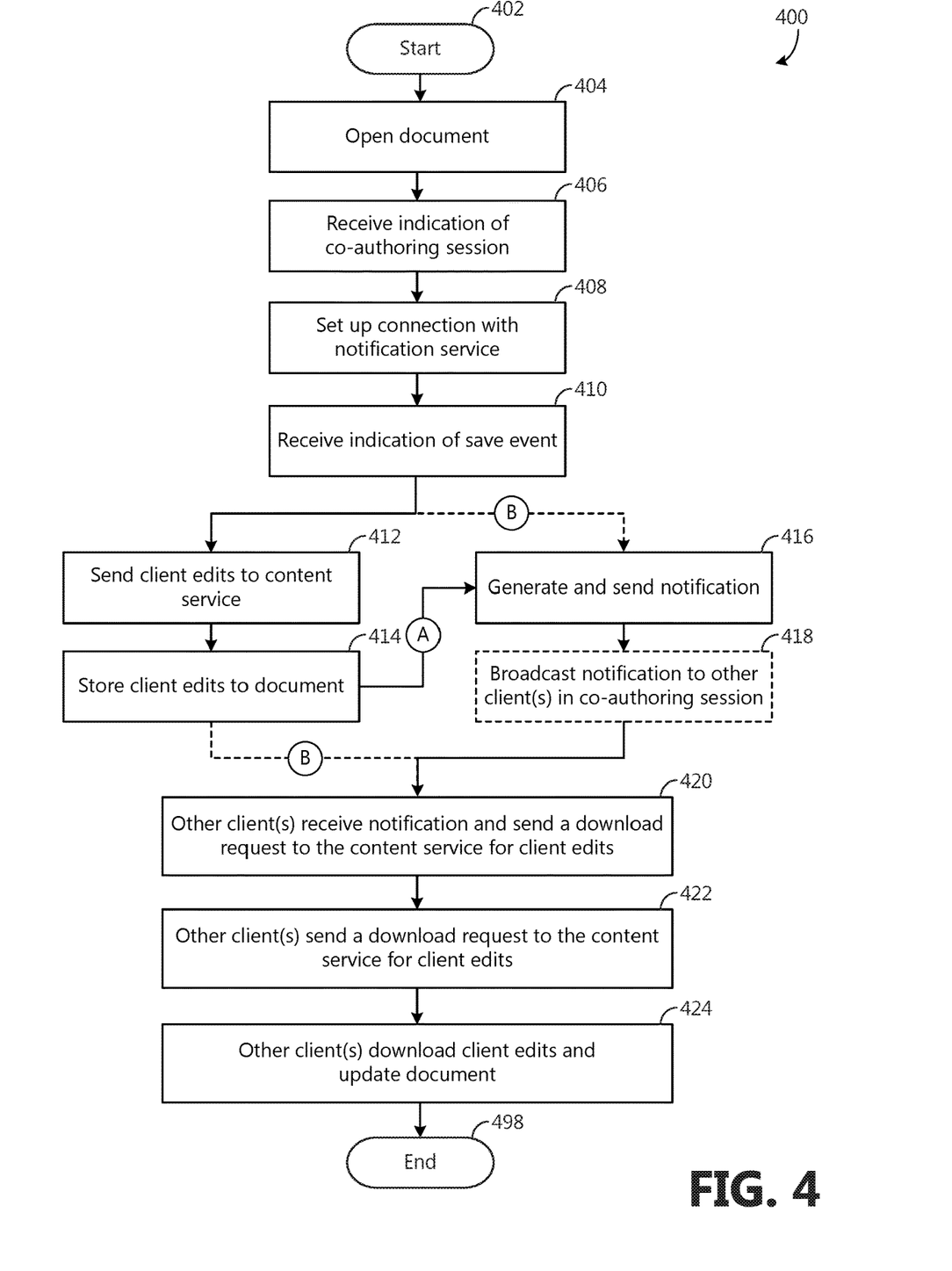
FIG. 4 is a flow chart showing general stages involved in an example method for reducing latency of document change discovery in a co-authoring session.

Having described an operating environment and various components of the latency-reduced change discovery system with respect to FIGS. 1-3, FIG. 4 is a flow chart showing general stages involved in an example method 400 for reducing latency in document change discovery. With reference now to FIG. 4, the method 400 begins at start OPERATION 402, and proceeds to OPERATION 404, where an authorized user 102 selectively opens an electronic document 112 via an application 106 executing on a first client computing device 104a, and a local copy 115a of the document 112 is created. For example the electronic document 112 is stored in a storage repository 114 managed by a content service 118 executing on a content server 108, and a local copy 115a is instantiated for editing on the first client computing device 104a.

The method 400 proceeds to OPERATION 406, where an indication of a co-authoring session is received. For example, the content change manager 206 receives an indication from the content service 118 that a co-authoring session of the document 112 has been initiated. For example, at least one other local copy 115b-n of the electronic document 112 is simultaneously opened on at least one other client computing device 140b-n.

The method 400 proceeds to OPERATION 408, where the content change manager 206 notifies the notification manager 208 of the co-authoring session. In response, the notification manager 208 makes an API call to the notification service 116 to establish a real-time or near real-time communication connection (i.e., transport 105) with the notification service 116. Additionally, the one or more other client computing devices 104b-n make an API call to the notification service 116 to establish a real-time or near real-time communication connection (i.e., transport 105) with the notification service 116. In some examples, such as when the transport 105 is embodied as a peer-to-peer communication connection 109, the notification service 116 coordinates the peer-to-peer connection(s) between the client computing devices 104a-n in the co-authoring session.

The method 400 proceeds to OPERATION 410, where client edits 103 to the local copy 115a of the document 112 are made, and an indication of a save event is received, for example, a manual save initiated by the user 102 or an automatic save initiated by the autosave system 210.

According to an aspect, in a first configuration setting A, the method 400 continues to OPERATION 412, where the content change manager 206 generates a client edits upload request 302 including client edits 103 made by the user 102 to the local copy 115a of the electronic document 112, and sends the upload request 302 to the content service 118. The method 400 continues from OPERATION 412 to OPERATION 414, where the content service 118 saves the client edits 103 to the master copy of the electronic document 112 stored in the storage repository 114. Upon a successful save of the client edits 103 to the master copy of the electronic document 112, the content service 118 sends an indication of the successful save to the first client computing device 104a.

In the first configuration setting A, the method 400 proceeds to OPERATION 416, where upon receiving the indication of the successful save of the client edits 103 to the master copy of the electronic document 112 by the content service 118, the notification manager 208 generates a notification 107 related to the client edits upload request 302, and sends the notification 107 to the notification service 116. For example, the notification 107 indicates that client edits 103 have been made to the electronic document 112. According to an example, when the transport 105 is embodied as a peer-to-peer communication connection 109, at OPERATION 416, the notification manager 208 generates a notification 107 related to the client edits upload request 302, and sends the notification 107 to the one or more other client computing devices 104b-n in the co-authoring session via the peer-to-peer communication connection(s) 109.

In some examples, the method 400 continues from OPERATION 416 to optional OPERATION 418, where the notification service 116 broadcasts the notification 107 to the one or more other client computing devices 104b-n in the co-authoring session of the electronic document 112. In other examples (e.g., when the transport 105 is embodied as a peer-to-peer communication connection 109), the method 400 continues from OPERATION 416 to OPERATION 420.

According to another aspect, in a second configuration setting B, after OPERATION 410, the method 400 executes OPERATIONS 412 and 414 in parallel to OPERATION 416 (and, optionally, OPERATION 418), and proceeds to OPERATIONS 412 and 416. At OPERATION 412, the content change manager 206 generates a client edits upload request 302 including client edits 103 made by the user 102 to the local copy 115a of the electronic document 112, and sends the upload request 302 to the content service 118. The method 400 continues from OPERATION 412 to OPERATION 414, where the content service 118 saves the client edits 103 to the master copy of the electronic document 112 stored in the storage repository 114.

According to configuration setting B, in parallel to OPERATION 412, the method 400 performs OPERATION 416, where the notification manager 208 generates a notification 107 related to the client edits upload request 302, and sends the notification 107 to the notification service 116. For example, the notification 107 indicates that client edits 103 have been made to the electronic document 112. In some examples (e.g., when the transport 105 is embodied as a peer-to-peer communication connection 109), the notification manager 208 generates a notification 107 related to the client edits upload request 302, and sends the notification 107 to the one or more other client computing devices 104b-n in the co-authoring session via the peer-to-peer communication connection(s) 109.

In some examples, the method 400 continues from OPERATION 416 to optional OPERATION 418, where the notification service 116 broadcasts the notification 107 to the one or more other client computing devices 104b-n, which establish a real-time or near real-time communication connection (i.e., transport 105) with the notification service 116 in association with the co-authoring session of the electronic document 112. In other examples (e.g., when the transport 105 is embodied as a peer-to-peer communication connection 109), the method 400 skips optional OPERATION 418.

Regardless of whether the method performs operations 412-416 (or 412-418) in series according to configuration A or in parallel according to configuration B, the method 400 then continues to OPERATION 420, where the one or more other client computing devices 104b-n receive the notification 107 that client edits 103 have been made to the electronic document 112.

The method 400 proceeds to OPERATION 422, where, in response to receiving the notification 107, the one or more other client computing devices 104b-n generate and send a client edits download request 304 to the content service 118.

The method 400 continues to OPERATION 424, where the one or more client computing devices 104b-n download the client edits 103 made to the electronic document 112 by the first client computing device 104a, and merge the client edits 103 with the local copy 115b-n of the electronic document 112. The method 400 concludes at end OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
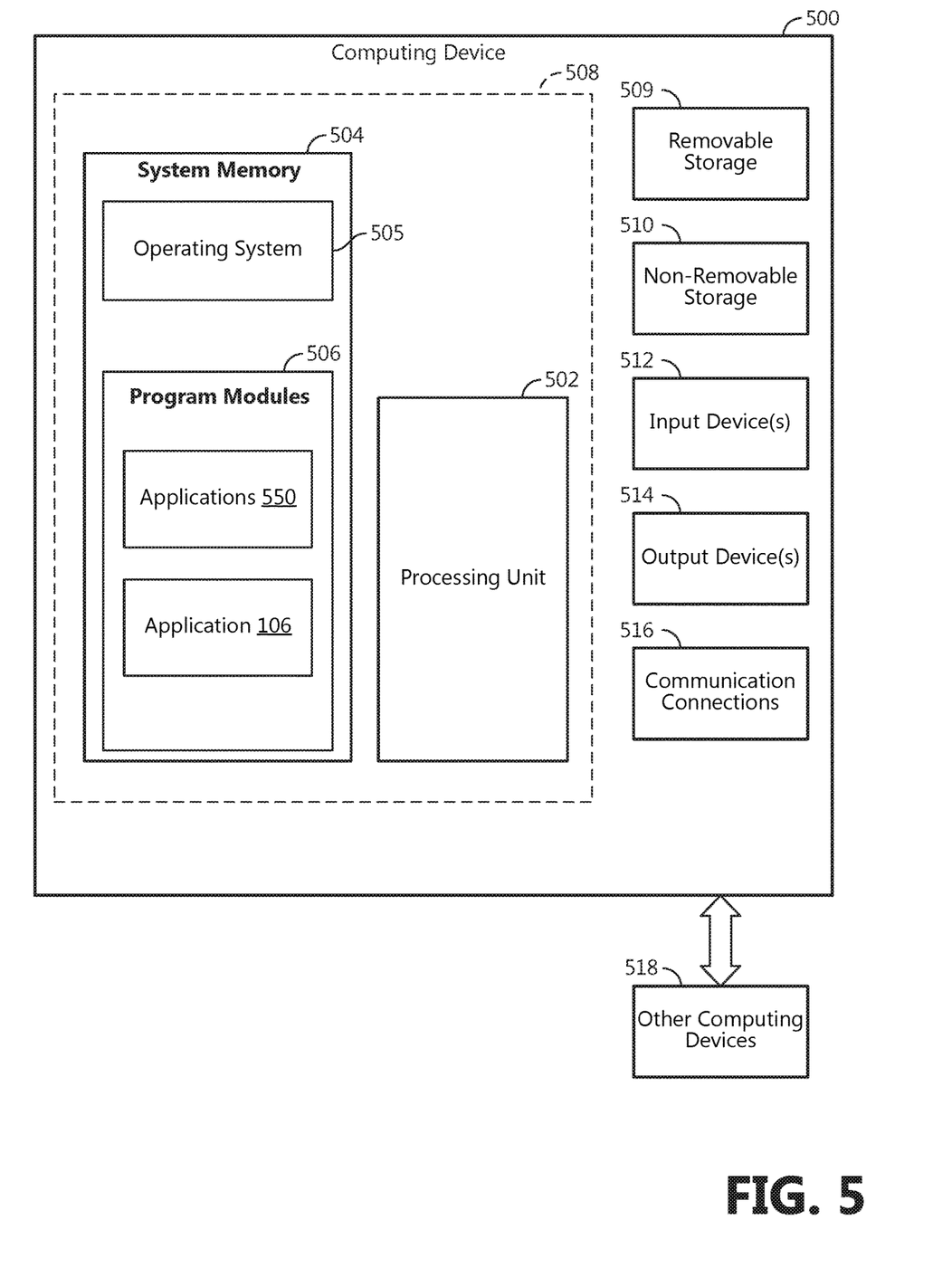
FIG. 5 is a block diagram illustrating example physical components of a computing device.
Figure 6A:
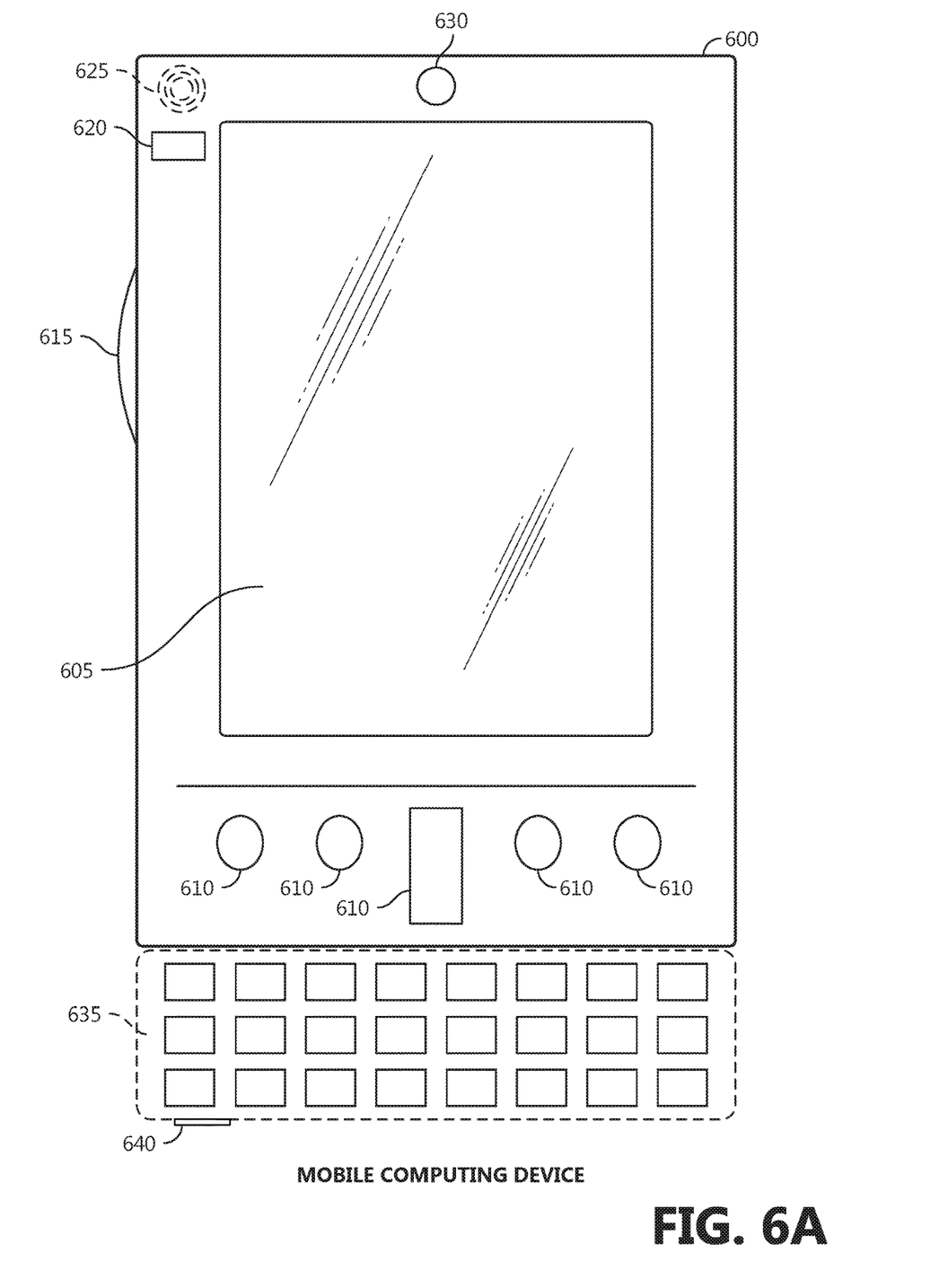
FIGS. 6A and 6B are block diagrams of a mobile computing device.
Figure 6B:
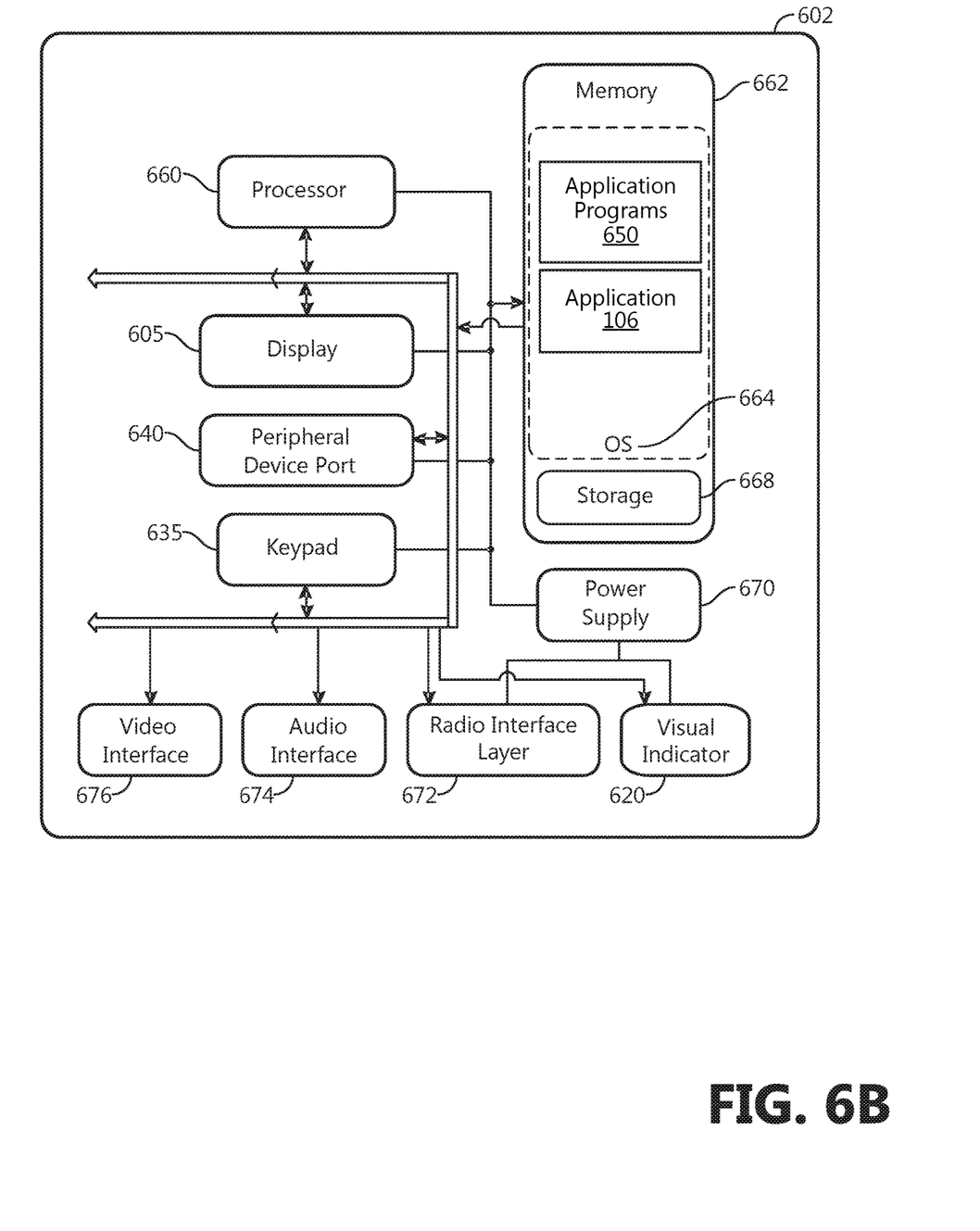
Figure 7:
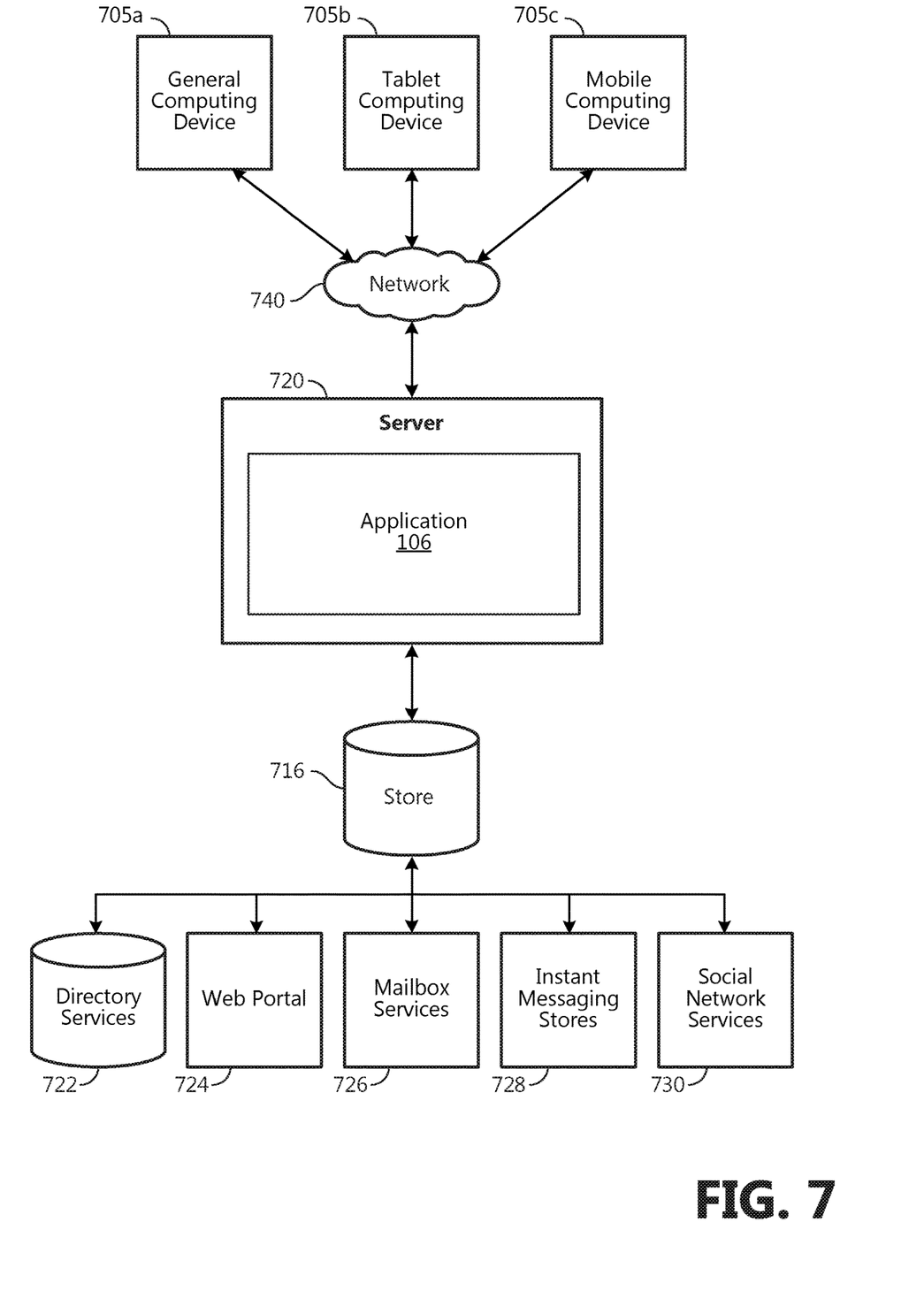
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes application 106. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., applications 106) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, application 106 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for latency-reduced document change discovery as described above. Content developed, interacted with, or edited in association with the application 106 is enabled to be stored in different communication channels or other storage types. For example, various documents may be stored using a directory service 722, a web portal 724, a mailbox service 726, an instant messaging store 728, or a social networking site 730. The application 106 is operative to use any of these types of systems or the like for reducing latency of document change discovery in a co-authoring session, as described herein. According to an aspect, a server 720 provides the application 106 to clients 705a,b,c. As one example, the server 720 is a web server providing the application 106 over the web. The server 720 provides the application 106 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for latency-reduced document change discovery in a co-authoring session, comprising:

receiving, from a first client computing device, an indication of a save event associated with an instantiation of a first local copy of a document on the first client computing device, a master copy of the document being stored in a storage repository; and directly responsive to receiving the indication of the save event:

causing an upload of edits made to the first local copy of the document at the first client computing device, the upload for updating the master copy of the document with the edits via a content channel;

providing to a second client computing device associated with the co-authoring session, via a communication channel that is separate from the content channel, a notification that the master copy of the document is being updated with the edits, the second client computing device being associated with an instantiation of a second local copy of the document, wherein the communication channel comprises a real-time or near real-time, bi-directional communication channel that is a persistently open channel;

receiving from the second client computing device, an edits download request, the edits download request requesting the edits made to the master copy of the document; and based on receiving the edits download request, providing the second client computing device, via the content channel, the edits made to the master copy of the document to enable merging the edits made to the master copy of the document with the second local copy of the document.

2. The computer-implemented method of claim 1, further comprising receiving an indication that the document is associated with the co-authoring session.

3. The computer-implemented method of claim 1, wherein transmission of the upload and the notification occur simultaneously.

4. The computer-implemented method of claim 1, wherein receiving the indication of the save event comprises receiving an indication of a manual save selection.

5. The computer-implemented method of claim 1, wherein the edits download replaces a polling request of the second client computing device.

6. The computer-implemented method of claim 1, wherein the download request is only generated responsive to receipt of the notification at the second client computing device to the exclusion of any polling download requests by the second client computing device.

7. The computer-implemented method of claim 1, further comprising providing an indication of a successful save event to the first client computing device.

8. A system for latency-reduced document change discovery in a co-authoring session, comprising:
 a processor; and
 a memory for storing instructions that, when executed by the processor, perform operations, comprising:
  receiving an indication of a save event associated with an instantiation of a first local copy of a document on the first client computing device, a master copy of the document being stored in a storage repository; and
  directly responsive receiving the indication of the save event:
   causing an upload of edits made to the first local copy of the document at the first client computing device, the upload for updating the master copy of the document with the edits via a content channel;
   providing to a second client computing device associated with the co-authoring session, via a communication channel that is separate from the content channel, a notification that the master copy of the document is updated with the edits, the second client computing device being associated with an instantiation of a second local copy of the document, wherein the communication channel comprises a real-time or near real-time, bi-directional communication channel that is a persistently open channel;
   receiving from the second client computing device, an edits download request, the edits download request requesting the edits made to the master copy of the document; and
   based on receiving the edits download request, providing the second client computing device, via the content channel, the edits made to the master copy of the document to enable the second client device to merge the edits made to the master copy of the document with the second local copy of the document.

9. The system of claim 8, further comprising instructions for providing an indication that the document is associated with the co-authoring session.

10. The system of claim 8, wherein the save comprises one of:
 a manual save; or
 an autosave.

11. The system of claim 8, wherein the edits download request replaces a polling request of the second client computing device.

12. The system of claim 8, wherein the download request is only generated responsive to receipt of the notification at the second client computing device to the exclusion of any polling download requests by the second client computing device.

13. Computer storage media storing executable instructions that when executed by a processor, cause a computing device to:
 receive an indication of a save event associated with an instantiation of a first local copy of a document on the first client computing device, a master copy of the document being stored in a storage repository; and
 directly responsive to receiving the indication of the save event;
 cause an upload of edits made to the first local copy of the document at the first client computing device, the upload for updating the master copy of the document with the edits via a content channel;
 provide to a second client computing device associated with the co-authoring session, via a communication channel that is separate from the content channel, a notification indicating that the master copy of the document is updated with the edits, the second client computing device being associated with an instantiation of a second local copy of the document, wherein the communication channel comprises a real-time or near real-time, bi-directional communication channel that is a persistently open channel;
 receive from the second client computing device, an edits download request for receiving the edits made to the master copy of the document; and
 based on receiving the edits download request, provide the second client computing device via the content channel, the edits made to the master copy of the document.

14. The computer storage media of claim 13, wherein the edits download request replaces a polling request of the second client computing device.

15. The computer storage media of claim 13, wherein the download request is generated responsive to receipt of the notification at the second client computing device to the exclusion of any polling download requests by the second client computing device.

16. The computer storage media of claim 13, wherein the save event comprises a manual save.

17. The computer storage media of claim 13, wherein the save event comprises an autosave.

18. The computer storage media of claim 13, wherein providing the second client computing device, via the content channel, the edits made to the master copy of the document enables the second client computing device to merge the edits made to the master copy of the document with the local copy of the document.

19. The computer storage media of claim 13, further comprising instructions for providing an indication that the document is associated with the co-authoring session.

20. The computer storage media of claim 13, wherein transmission of the upload and the notification occur simultaneously.

* * * * *